US011486357B2

(12) United States Patent
Fang et al.

(10) Patent No.: US 11,486,357 B2
(45) Date of Patent: Nov. 1, 2022

(54) METHOD AND APPARATUS FOR SELF-ADAPTION OF A CUT-OUT STRATEGY

(71) Applicant: BEIJING GOLDWIND SCIENCE & CREATION WINDPOWER EQUIPMENT CO., LTD., Beijing (CN)

(72) Inventors: Cheng Fang, Beijing (CN); Pengfei Zhang, Beijing (CN); Minghui Wang, Beijing (CN); Guilin Zhou, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 786 days.

(21) Appl. No.: 16/333,125

(22) PCT Filed: Jul. 10, 2018

(86) PCT No.: PCT/CN2018/095161
§ 371 (c)(1),
(2) Date: Mar. 13, 2019

(87) PCT Pub. No.: WO2019/148770
PCT Pub. Date: Aug. 8, 2019

(65) Prior Publication Data
US 2021/0372370 A1    Dec. 2, 2021

(30) Foreign Application Priority Data
Jan. 31, 2018   (CN) .......................... 201810098056.3

(51) Int. Cl.
*F03D 7/04* (2006.01)
(52) U.S. Cl.
CPC .......... *F03D 7/046* (2013.01); *F05B 2260/84* (2013.01); *F05B 2270/3201* (2013.01); *F05B 2270/335* (2013.01); *F05B 2270/709* (2013.01)
(58) Field of Classification Search
None
See application file for complete search history.

(56) References Cited

U.S. PATENT DOCUMENTS

| | | | | |
|---|---|---|---|---|
| 6,975,925 B1* | 12/2005 | Barnes | ..................... | F03D 7/048 700/286 |
| 8,694,268 B2* | 4/2014 | Karikomi | .............. | F03D 7/0292 702/34 |
| 9,097,236 B2* | 8/2015 | Zhou | ....................... | F03D 7/043 |
| 9,702,345 B2* | 7/2017 | Guadayol Roig | ...... | F03D 7/046 |
| 10,337,498 B2* | 7/2019 | Wang | ....................... | F03D 7/045 |
| 11,041,483 B2* | 6/2021 | Tomas | .................. | F03D 7/0292 |
| 2002/0194113 A1 | 12/2002 | Lof et al. | | |
| 2006/0273595 A1 | 12/2006 | Avagliano et al. | | |
| 2008/0086281 A1* | 4/2008 | Santos | .................. | F03D 7/0292 700/32 |
| 2011/0018271 A1* | 1/2011 | Karikomi | .............. | F03D 7/0292 290/44 |
| 2013/0320674 A1* | 12/2013 | Ingram | ................... | H02J 3/381 290/43 |
| 2014/0248123 A1* | 9/2014 | Turner | .................... | F03D 7/042 415/15 |
| 2014/0328678 A1* | 11/2014 | Guadayol Roig | ...... | F03D 7/046 416/43 |
| 2015/0003983 A1 | 1/2015 | Coultate | | |
| 2016/0215759 A1 | 7/2016 | Fleming et al. | | |
| 2017/0268487 A1 | 9/2017 | Yang et al. | | |
| 2018/0223807 A1* | 8/2018 | Badrinath Krishna | ...................... | F03D 7/0284 |
| 2021/0372370 A1* | 12/2021 | Fang | ....................... | F03D 7/046 |

FOREIGN PATENT DOCUMENTS

| | | | |
|---|---|---|---|
| CN | 101832230 A | 9/2010 | |
| CN | 102102626 A | 6/2011 | |
| CN | 102709908 A | 10/2012 | |
| CN | 102713273 A | 10/2012 | |
| CN | 103244354 A | 8/2013 | |
| CN | 103573550 A | 2/2014 | |
| CN | 103915855 A | 7/2014 | |
| CN | 104806448 | 7/2015 | |
| CN | 105275742 A | 1/2016 | |
| CN | 105354620 A | 2/2016 | |
| CN | 106058941 A | 10/2016 | |
| CN | 106812658 A | 6/2017 | |
| CN | 1070691158 A | 8/2017 | |
| EP | 2320077 A1 * | 5/2011 | ........... F03D 7/0292 |
| EP | 2320077 B1 | 5/2011 | |
| EP | 2840257 A1 | 2/2015 | |
| EP | 2320077 A4 * | 3/2015 | ........... F03D 7/0292 |

(Continued)

OTHER PUBLICATIONS

V. Petrovic et al; "Wind turbine optimal control during storms", The Science of Making Torque from Wind 2014 (Torque 2017); Journal of Physics: Conference Series 524; 10 pages; Jun. 16, 2014.

(Continued)

Primary Examiner — Kevin R Steckbauer

(57) ABSTRACT

The present disclosure provides a method and an apparatus for self-adaption of a cut-out strategy. The method may include: predicting, using a wind speed prediction model, a wind resource parameter of a wind turbine at each machine location; predicting, using a load prediction model, a fatigue load and a limit load of the wind turbine based on the predicted wind resource parameter and an air density; comparing the predicted fatigue load and limit load with a reference load; and determining the cut-out strategy based on a result of the comparison, wherein determining the cut-out strategy includes determining a cut-out wind speed and an output power.

20 Claims, 4 Drawing Sheets

(56) References Cited

FOREIGN PATENT DOCUMENTS

| EP | 2320077 | B1 | | 5/2016 | |
|----|---------|----|---|--------|---|
| EP | 2320077 | B1 | * | 10/2016 | ........... F03D 7/0292 |
| JP | 2008064081 | A | | 3/2008 | |
| JP | 2009167848 | A | | 7/2009 | |
| JP | 2016-079965 | A | | 5/2016 | |
| JP | 2016136001 | A | | 7/2016 | |
| JP | 2017141747 | A | | 8/2017 | |
| WO | 2011/140818 | A1 | | 11/2011 | |
| WO | 2016/082838 | A1 | | 6/2016 | |

OTHER PUBLICATIONS

International Search Report and Written Opinion dated Oct. 25, 2018, PCT/CN2018/095161.
Australian Exam Report #1; dated Apr. 7, 2020; Appln. No. 2018327223.
Extended European Search Report dated Mar. 20, 2020; Appln. No. 18852761.8.
The First Chinese Office Action dated Nov. 29, 2019; Appln. No. 201810098056.3.
Mate Jelavic, et al.; "Wind turbine control beyond the cut-out wind speed", Croatian scientific bibliography: 619383; Online proceedings of annual conference and exhibition of European Wind Energy Association, 2013, 9 pages.
G.N. Kariniotakis, et al.; "Wind Power Forecasting Using Advanced Neural Networks Models", IEEE Transactions on Energy Conversion, vol. 11, No. 4, Dec. 1996, 6 pages.
Matthias Lange, et al.; "Physical Approach to Short-Term Wind Power Prediction", Crown copyright 2005, published by the Met Office; Springer ISBN-101 3-540-25662-8; 213 pages.
V. Petrovic, et al.; "Wind turbine optimal control during storms", The Science of Making Torque from Wind 2014 (TORQUE 2014); Journal of Physics: Conference Series 524(2014)012052; 10 pages.
P. Pinson, et al.; "Wind Power Forecasting using Fuzzy Neural Networks Enhanced with On-line Prediction Risk Assessment", Jun. 23-26, 2003 IEEE Bologna PowerTech Conference; 8 pages.
Nadja Saleck, et al.; "Wind power forecast error smoothing within a wind farm", The Science of Making Torque from Wind IOP Publishing: Journal of Physics: Conference Series 75(2007); 8 pages.
Notice of Opposition against the European patent EP 3 540 213; dated Sep. 24, 2021; Appln. No. 18852761.8.
EPO Summons to attend oral proceedings pursuant to Rule 115(1) EPC; dated Jun. 29, 2022; Appln. No. 18852761.8.

* cited by examiner

US 11,486,357 B2

METHOD AND APPARATUS FOR SELF-ADAPTION OF A CUT-OUT STRATEGY

This application is a National Stage of International Application No. PCT/CN2018/095161, filed on Jul. 10, 2018, which claims priority to Chinese Patent Application No, 201810098056.3, filed on Jan. 31, 2018, both of which are incorporated herein by reference in their entireties.

FIELD

The present disclosure relates to a technical field of wind power generation, in particular, to a method and an apparatus for self-adaption of a cut-out strategy.

BACKGROUND

When designing a cut-out wind speed of wind turbines, economy and safety are usually considered synthetically. However, due to uncertainty of wind resources on the spot and limitations of traditional control methods, the cut-out wind speed can only be selected to be fixed and relatively conservative, which may ensure the safety of the wind turbines, but fails to consider the difference in wind resource at a machine location of each wind turbine, and thus cannot optimize the economics of the wind turbines.

Therefore, there is a need for a cut-out strategy for dynamic optimization of wind turbines to maximize the use of wind resources and further enhance the economics of the wind turbines.

SUMMARY

According to an aspect of the present disclosure, there is provided a method for self-adaption of a cut-out strategy. The method may include: predicting, using a wind speed prediction model, a wind resource parameter of a wind turbine at each machine location; predicting, using a load prediction model, a fatigue load and a limit load of the wind turbine based on the predicted wind resource parameter and an air density; comparing the predicted fatigue load and limit load with a reference load; and determining the cut-out strategy based on a result of the comparison, wherein determining the cut-out strategy includes determining a cut-out wind speed and an output power.

According to another aspect of the present disclosure, there is provided an apparatus for self-adaption of a cut-out strategy. The apparatus may include: a wind speed prediction module configured to predict, using a wind speed prediction model, a wind resource parameter of a wind turbine at each machine location; a load prediction module configured to predict, using a load prediction model, a fatigue load and a limit load of the wind turbine based on the predicted wind resource parameter and an air density; a controller configured to compare the predicted fatigue load and limit load with a reference load and determine the cut-out strategy based on a result of the comparison, wherein the determination of the cut-out strategy includes determining a cut-out wind speed and an output power.

According to an aspect of the present disclosure, there is provided a computer readable storage medium storing a program, wherein the program includes instructions for performing the above method for self-adaption of a cut-out strategy.

According to an aspect of the present disclosure, there is provided a computer comprising a readable medium that stores a computer program, wherein the computer program includes instructions for performing the above method for self-adaption of a cut-out strategy.

DETAILED DESCRIPTION

Before describing the present disclosure, parameters used in the present disclosure are described in detail, and the specific parameters include:

cut-out wind speed, which refers to a maximum wind speed of a wind turbine generating electricity connected to the grid (when wind speed exceeds the maximum wind speed, the wind turbine will shut down);

rated power, which refers to the output power of the wind turbine under normal operation conditions of the wind turbine;

fatigue load, which is used to describe an accumulation of loss of the wind turbine during a long-term operation;

limit load, which is used to describe ability of the wind turbine to withstand extreme wind conditions; and reference load, which is a design value for the fatigue load and the limit load of the wind turbine.

Hereinafter, exemplary embodiments of the present disclosure will be described in detail with reference to the accompanying drawings.

Figure 1:
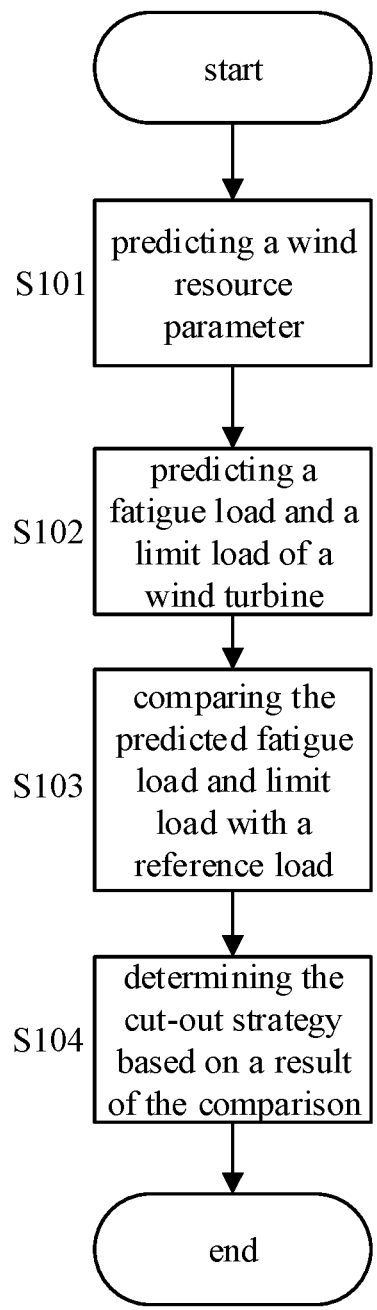
FIG. 1 is a flowchart of a method for self-adaption of a cut-out strategy according to an exemplary embodiment of the present disclosure.

FIG. 1 is a flowchart of a method for self-adaption of a cut-out strategy according to an exemplary embodiment of the present disclosure.

Referring to FIG. 1, at step S101, a wind resource parameter of a wind turbine at each machine location is predicted using a wind speed prediction model. The step of predicting the wind resource parameter of the wind turbine at each machine location using the wind speed prediction model may include: training the wind speed prediction model by applying a neural network algorithm based on historical wind resource parameters measured by a wind tower.

In an embodiment of the present disclosure, the wind speed prediction model may be trained by applying an artificial neural network algorithm and using historical wind resource parameters measured by the wind tower in a project site. The historical wind resource parameters measured by the wind tower will be used to establish a database of wind resources to cover a wide range of historical wind resource parameters, which may include average wind speed, turbulence intensity, wind shear, inflow angle, air density, probability density distribution of wind speed, etc.

As an example, the step of predicting the wind resource parameter of the wind turbine at each machine location using the wind speed prediction model may further include: correcting the trained wind speed prediction model in real time using a real-time wind speed measured by a wind measuring device (e.g., a laser radar or other pre-wind-measuring device). Specifically, as a wind farm is mostly located in a mountain, the wind resource parameters at the wind turbine have great uncertainty. Therefore, the wind measuring device may measure the wind speed in real time, and the measured real-time wind speed may be used to correct the trained wind prediction model in real time, so that the wind prediction model trained by the present disclosure may be adapted to different environments with consideration in the randomness and intermittentness of the wind speed.

As each wind turbine has a different machine location, there is a difference in the wind resources at the machine location of each wind turbine. By using the trained wind speed prediction model, it is possible to predict wind resource parameters at a specific moment or a certain period in the future for the respective machine location, such as an average wind speed value (e.g., an average wind speed value for 10 minutes), turbulence intensity, wind shear, etc.

At step S102, a fatigue load and a limit load of the wind turbine is predicted using a load prediction model based on the predicted wind resource parameter and an air density. In the art of wind power, the fatigue load and the limit load of the wind turbine generally refer to a prediction of the fatigue load and the limit load for each of at least one component of the wind turbine. The components of the wind turbine may include: a tower bottom, a tower top, a rotating hub, a fixed hub, a blade root device, a yaw device, and the like. The disclosure is not limited in this respect.

The step of predicting the fatigue load and the limit load of the wind turbine using the load prediction model may include sampling historical wind resource parameters measured by a wind tower. Specifically, statistics are performed on the historical wind resource parameters measured by the wind tower in the wind farm (i.e., the range or distribution of each wind resource parameter in a specific region of the wind faun is divided and a wind resource parameter database is established), and the wind resource parameters are sampled from the established wind resource parameter database using a Monte-Carlo sampling method. For example, the range of each wind resource parameter and its corresponding probability may be obtained by performing statistics on the wind resource parameters measured by the wind tower; and the Monte-Carlo sampling method may be used to sample the wind resource parameters so that the input sample size can be reduced. Moreover, original coverage of the wind resource parameters is not changed, thus the comprehensiveness of wind resource information can be ensured.

The step of predicting the fatigue load and the limit load of the wind turbine using the load prediction model may further include performing, by a wind turbine simulation system, a simulation with the sampled wind resource parameters as inputs of load calculation. After sampling the wind resource parameters, the sampled wind resource parameters may be used as inputs to the load calculation, and the wind turbine simulation system (for example, a wind turbine simulation software) may be used to simulate load data of the wind turbine. For example, in an embodiment of the present disclosure, the load data of the wind turbine may be simulated using a simulation system such as bladed or HACW2, and a load database with high fidelity may be built using a result of the simulation.

The step of predicting the fatigue load and the limit load of the wind turbine using the load prediction model may further include building the load prediction model using the result of the simulation based on a nonlinear regression method. A load prediction model may be built with the simulation results of the wind turbine simulation software using a nonlinear regression method in order to predict the equivalent fatigue load and limit load of the components of the wind turbine. Specifically, after calculation of load using the wind turbine simulation software such as bladed or HACW2, the load of the wind turbine corresponding to different wind resource parameters may be obtained. The simulated load data may be used as samples for building the load prediction model, and the nonlinear regression method may be adopted to train the load prediction model. The nonlinear regression method may be a prior art for building a model, and will not be described again here. In the present disclosure, the load prediction model may be a Wind2load model. The predicted wind resource parameter(s) may be used as an input(s), and the load level for each component of the wind turbine may be output via the built Wind2load model.

At step S103, the predicted fatigue load and limit load are compared with a corresponding reference load. Each component of the wind turbine has its own corresponding reference load. For example, for a factory setting of the wind turbine, the tower top of the wind turbine has a reference load of the tower top, and the tower bottom of the wind turbine has a reference load of the tower bottom. The predicted fatigue load and limit load of each component may be compared with the corresponding reference load of the component. For example, the predicted fatigue load and limit load of the tower top are compared with the reference load of the tower top respectively.

At step S104, a cut-out strategy is determined based on a result of the comparison at step S103. The step of determining the cut-out strategy may include adjusting a cut-out wind speed and an output power.

Based on ratios of the predicted fatigue load and limit load of each component to the reference load of the component, the cut-out wind speed and the output power may be dynamically adjusted, that is, the cut-out strategy may be optimized, so that the use of the wind resource can be maximized and the economy of the wind turbine can be further improved. Below, how to determine the cut-out strategy based on the comparison of the predicted fatigue load and limit load of each component with the reference load of the component will be described in detail with reference to FIG. 2.

Figure 2:
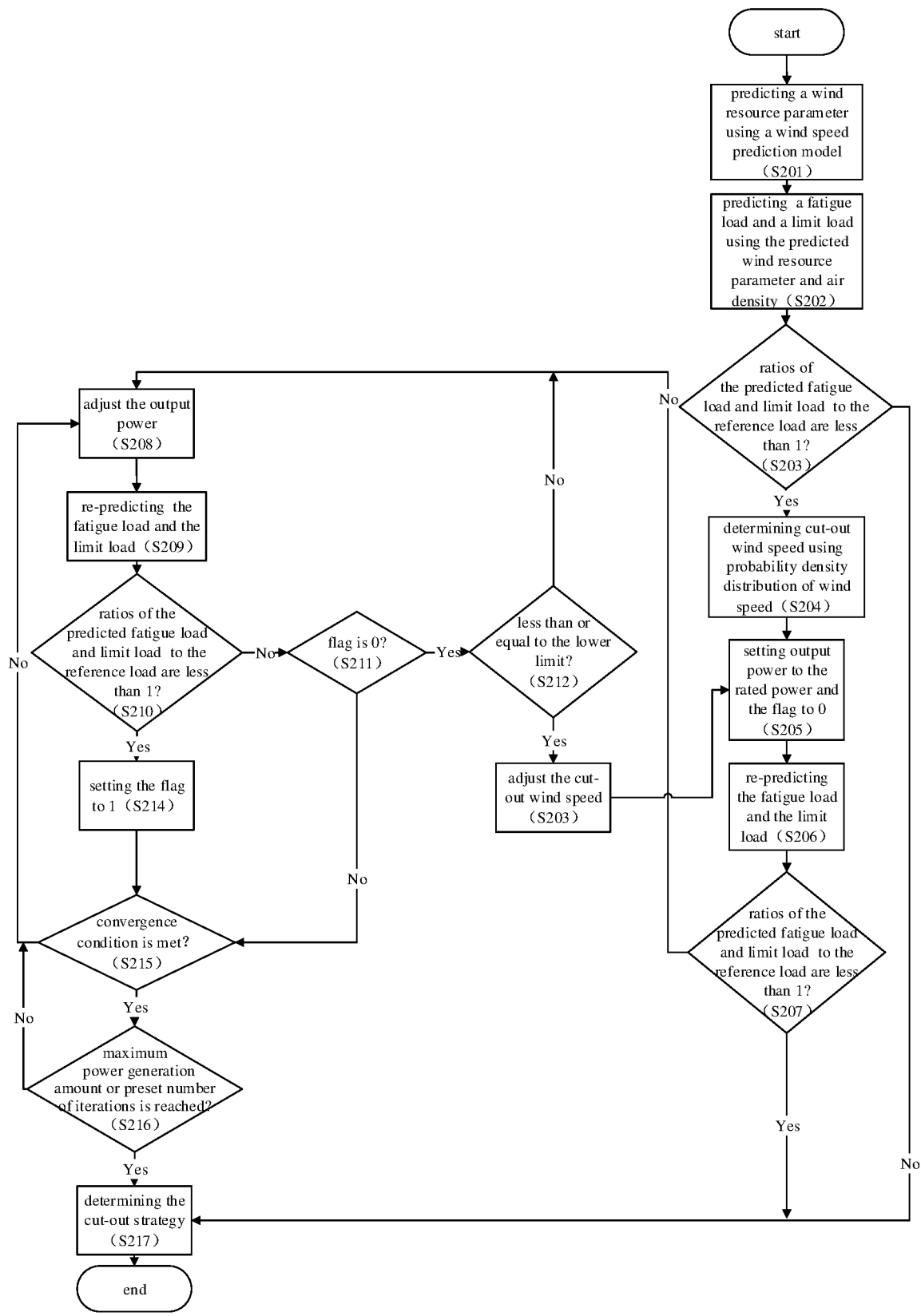
FIG. 2 is a detailed flowchart of a method for self-adaption of a cut-out strategy according to an exemplary embodiment of the present disclosure.

FIG. 2 is a detailed flowchart of a method for self-adaption of a cut-out strategy according to an exemplary embodiment of the present disclosure.

Referring to FIG. 2, at step S201, a wind speed prediction model is used to predict a wind resource parameter of the environment in which the wind turbine at each machine location is located. The wind speed prediction model may be trained by applying, for example, a neural network algorithm based on historical wind resource parameters of the environment in which the wind turbine is located. The algorithm for training the wind speed prediction model in the present disclosure is not limited to the embodiment. In addition, the wind speed prediction model may be corrected based on the wind speed measured in real time, so that the trained wind speed prediction model may have a better prediction accuracy. A laser radar wind measuring device may be used to measure the wind speed of the environment in which the wind turbine is located in real time.

At step S202, the wind resource parameter predicted at step S201 is used in conjunction with the air density measured by the wind tower to predict the fatigue load and the limit load of the wind turbine. A database of wind resource parameters that cover a wide range may be established and the wind resource parameters are sampled by the Monte-Carlo sampling method. Using the wind turbine simulation software such as bladed/HACW2, the above sampled wind resource parameters may be used as the inputs of the load calculation for simulation calculation. Results of the simulation may be used to establish a load database with high-fidelity. The nonlinear regression algorithm may be used to build the Wind2load model. The predicted wind resource parameters and the measured air density may be input to the Wind2load model to quickly output the predicted equivalent fatigue load and limit load of the components of the wind turbine. In an embodiment of the present disclosure, a nonlinear regression method is used to build the load prediction model, but the disclosure is not limited in this respect.

At step S203, the predicted fatigue load and limit load of the wind turbine are compared with the reference load (hereinafter, this comparison is referred to as "a first comparison"). When any of ratios of the predicted fatigue load and limit load respectively to the reference load is greater than or equal to 1, a cut-out strategy with an original cut-out wind speed and a rated power is determined as a final cut-out strategy; when both of the ratios of the predicted fatigue load and limit load respectively to the reference load are less than 1, the cut-out wind speed and the output power are adjusted.

As an example, at step S203, when any of the ratios of the predicted fatigue load and limit load of each component respectively to the respective reference load of the component is greater than or equal to 1, the process proceeds to step S217, where the cut-out strategy with the original cut-out wind speed is determined as the final cut-out strategy, and the shutdown processing of the wind turbine is performed according to the final cut-out strategy.

When both of the ratios of the predicted fatigue load and limit load of each component respectively to the respective reference load of the component are less than 1 at step S203, the cut-out wind speed may be re-determined based on the probability density distribution of the wind speed at step S204. Specifically, in the field of wind power, the probability density distribution of wind speed is generally considered as a Weibull distribution. For example, if the Weibull parameter for the probability density of wind speed at the wind turbine is A=7 and K=1.6, the probability density distribution from a cut-in wind speed to a cut-out wind speed of the wind turbine is shown in Table 1.

There is a requirement that the probability density from the original cut-out wind speed to the current cut-out wind speed is greater than 0.0005, that is, the number of hours occupied in a year needs to be greater than 4.3 hours. It can be seen from Table 1 that when the wind speed is 23 m/s, the probability density is 0.000574 and the number of hours occupied in a year is 5.028319, which meets the above requirement. Thus, the original cut-out wind speed may be extended to 23 m/s.

TABLE 1

| Wind Speed | Probability | Number of Hours Occupied in a Year |
| --- | --- | --- |
| 3 | 0.10584 | 927.1546 |
| 4 | 0.108315 | 948.8428 |

TABLE 1-continued

| Wind Speed | Probability | Number of Hours Occupied in a Year |
| --- | --- | --- |
| 5 | 0.104012 | 911.1452 |
| 6 | 0.095284 | 834.6872 |
| 7 | 0.084046 | 736.2471 |
| 8 | 0.071798 | 628.9481 |
| 9 | 0.059637 | 522.419 |
| 10 | 0.048303 | 423.1358 |
| 11 | 0.038232 | 334.9164 |
| 12 | 0.029622 | 259.4919 |
| 13 | 0.022497 | 197.0757 |
| 14 | 0.016767 | 146.8759 |
| 15 | 0.012274 | 107.519 |
| 16 | 0.008832 | 77.3722 |
| 17 | 0.006252 | 54.77104 |
| 18 | 0.004357 | 38.16338 |
| 19 | 0.00299 | 26.18818 |
| 20 | 0.002021 | 17.70656 |
| 21 | 0.001347 | 11.80103 |
| 22 | 0.000885 | 7.755888 |
| 23 | 0.000574 | 5.028319 |
| 24 | 0.000367 | 3.216877 |
| 25 | 0.000232 | 2.031404 |

After adjusting the cut-out wind speed, at step S205, the output power is set to the rated power and a flag indicating potential existence of a final cut-out strategy at the current cut-out wind speed is set to 0. When the flag is 0, it represents, at the currently set cut-out wind speed, there is no the case where both of the ratios of the predicted fatigue load and limit load of each component respectively to the corresponding reference load of the component are less than 1, that is, there may not be a final cut-out strategy at the currently set cut-out wind speed. The output power may be changed by changing a rotational speed of a impeller of the wind turbine and a torque of the wind turbine.

At step S206, after the cut-out wind speed is re-determined according to the probability density distribution of the wind speed and the output power is set to the rated power, the load prediction model is used for the currently set cut-out wind speed and output power to predict the fatigue load and the limit load of the wind turbine. For example, assume that the cut-out wind speed is set to 23 m/s at step S204 and the output power is set to 2000 Kw at step S205, the wind power parameter is re-predicted using the changed cut-out wind speed and then the re-predicted wind resource parameter is used to re-predict the fatigue load and the limit load of each component of the wind turbine.

At step 3207, the predicted fatigue load and limit load of the wind turbine are respectively compared with the corresponding reference load (hereinafter, this comparison is referred to as "a second comparison"). At step S207, when both of the ratios of the fatigue load and the limit load predicted for the currently set cut-out wind speed and output power respectively to the reference load are less than 1, the cut-out strategy with the current cut-out wind speed and the current output power may be determined as the final cut-out strategy, otherwise the cut-out strategy is re-adjusted.

As an example, when both of the ratios of the fatigue load and the limit load of each component predicted for the currently set cut-out wind speed and output power respectively to the reference load of the component are less than 1, the process proceeds to step S217 where the cut-out strategy with the current cut-out wind speed and output power is determined as the final cut-out strategy, and the shutdown processing of the wind turbine may be performed based on the final cut-out strategy.

As an example, when any of the ratios of the fatigue load and the limit load of each component predicted for the currently set cut-out wind speed and output power respectively to the reference load of the corresponding component is greater than or equal to 1, the cut-out strategy may be adjusted in a subsequent operation, that is, the process proceeds to step S208.

At step S208, the output power is re-adjusted. In some exemplary embodiments, a dichotomy method and a golden section method may be employed to adjust the output power. The present disclosure is not limited to the embodiments in this respect, and any other method may be employed to adjust the output power. For example, when the process proceeds to step S208 according to the determination result of step S207, the output power may be set to a half of the currently set output power, that is, 1000 Kw if the dichotomy method is used to adjust the output power. Then, the process proceeds to step S209.

At step S209, the fatigue load and the limit load of the wind turbine is re-predicted for the currently set cut-out wind speed and output power using the load prediction model. It should be noted that each time the fatigue load and the limit load of each component of the wind turbine is re-predicted, as the environment in which the wind turbine is located changes in real time, it is necessary to predict the wind resource parameter again, and then use the predicted wind resource parameter to predict the fatigue load and the limit load of the components of the wind turbine. This allows real-time tracking of current wind conditions and more accurate prediction of the fatigue load and the limit load. Thereafter, the process proceeds to step S210.

At step S210, the predicted fatigue load and limit load are compared with the corresponding reference load. When any of the ratios of the fatigue load and the limit load re-predicted for the currently set cut-out wind speed and output power respectively to the reference load is greater than or equal to 1, it is determined whether to reduce the cut-out wind speed and return to step S205; when both of the ratios of the fatigue load and the limit load re-predicted for the currently set cut-out wind speed and output power respectively to the reference load are less than 1, the flag is set to 1 and it is determined whether the cut-out strategy with the currently set cut-out wind speed and output power is the final cut-out strategy according to whether the currently set output power meets a convergence condition.

As an example, when any of the ratios of the fatigue load and the limit load of each component re-predicted for the currently set cut-out wind speed and output power respectively to the corresponding reference load of the component is greater than or equal to 1, it is determined whether to reduce the cut-out wind speed. That is, when any of the ratios is greater than or equal to 1, the process proceeds to step S211 to determine whether the flag is 0. If the flag is 0, the process proceeds to step S212 to determine whether the currently set output power is less than or equal to a predetermined lower limit.

At step S212, when the currently set output power is greater than the predetermined lower limit, the output power can be further reduced to determine the optimal cut-out strategy at the current cut-out wind speed, thus the process may proceed back to step S208 to re-adjust the output power, and then to step S209 (i.e., to perform re-prediction). At step S212, when the currently set output power is less than or equal to the predetermined lower limit, there is no need to further reduce the output power for the currently set cut-out wind speed, but it is necessary to reduce the cut-out wind speed to determine the cut-out strategy. Therefore, the process proceeds to step S213, where the cut-out wind speed is reduced. For example, the cut-out wind speed may be set to the currently set cut-out wind speed minus 1 m/s. However, the present disclosure is not limited in this respect, and the cut-out wind speed can be reduced by any suitable value. Below, how to adjust the cut-out strategy will be described in detail with reference to FIG. 3.

Figure 3:
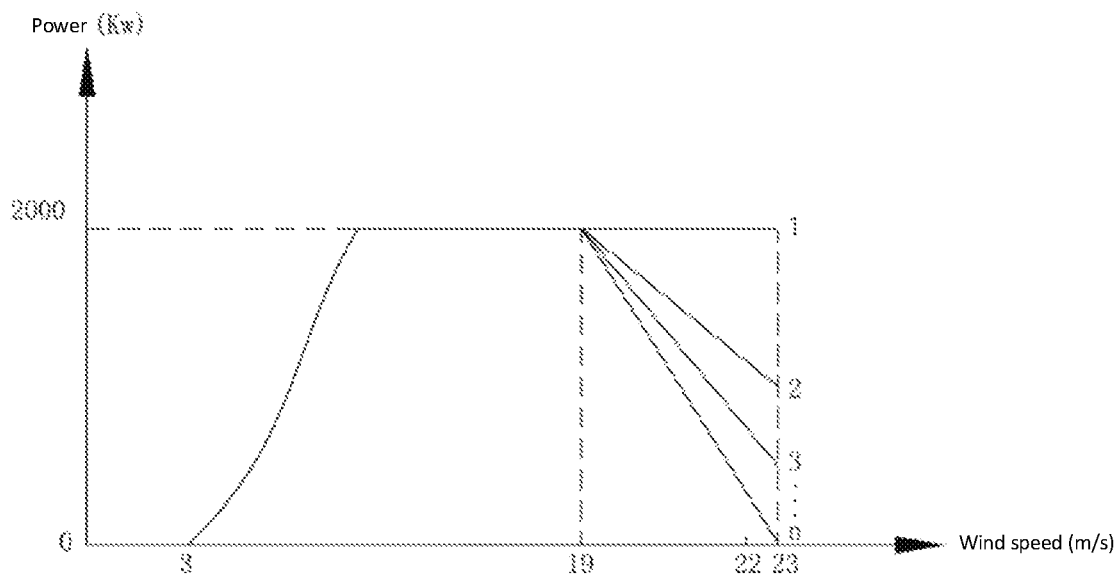
FIG. 3 is a diagram of adjusting a cut-out strategy based on a dichotomy method according to an exemplary embodiment of the present disclosure.

FIG. 3 a diagram of adjusting a cut-out strategy based on a dichotomy method according to an exemplary embodiment of the present disclosure. As shown in FIG. 3, when the second comparison is performed at step S207, if both of the ratios of the fatigue load and the limit load of each component predicted for the currently set cut-out wind speed and output power respectively to the correspond reference load of the component are less than 1, the cut-out wind speed may be determined as the currently set cut-out wind speed of 23 m/s, and the output power may be the rated power. That is, mode 1 in FIG. 3 is determined as the final cut-out strategy, and the shutdown processing of the wind turbine may be performed according to the final cut-out strategy.

At step S207, if any of the ratios of the fatigue load and the limit load of each component predicted for the currently set cut-out wind speed and output power respectively to the correspond reference load of the component is greater than or equal to 1, the output power may be set to a half of the rated power, i.e., 1000 Kw (mode 2 in FIG. 3) based on the dichotomy method. Then, at step S209, the fatigue load and the limit load of each component of the wind turbine are predicted again based on the currently set cut-out wind speed (23 m/s) and output power (1000 Kw). At step S210, the fatigue load and the limit load of each component predicted again may be respectively compared with the reference load of the component, and it is determined whether to perform step S211 or step S214 according to the comparison result. If any of the ratios of the fatigue load and the limit load of each component predicted from the reset output power respectively to the reference load of the corresponding component is greater than or equal to 1 at step S210, the flag is 0 at step S211, and the currently set output power is greater than the lower limit at step S212, the process returns back to step S208 to set the output power by using the dichotomy method, that is, the output power is set to 500 Kw (mode 3 in FIG. 3). If, in the subsequent operations, it is always determined that any of the ratios of the predicted fatigue load and limit load respectively to the reference load at each of the currently set cut-out wind speeds is greater than or equal to 1, that is, since step S207, there is no the case that both of the ratios of the predicted fatigue load and limit load respectively to the reference load are less than 1, and meanwhile the output power set in mode n is less than or equal to the preset lower limit, the process may proceed to step S213 where the currently set cut-out wind speed is reduced. For example, in this embodiment, the cut-out wind speed may be set to 22 m/s, then the process may return to step S205 where the output power is set to the rated power, the fatigue load and the limit load of each component of the wind turbine may be predicted again.

It should be noted that there is a case that even if the output power is adjusted to the preset lower limit (i.e., a non-zero minimum value) based on the dichotomy method, the predicted fatigue load or limit load of each component will be greater than the reference load with the currently set cut-out wind speed, regardless of how the output power is set. In this case, only the cut-out wind speed can be reduced. In some exemplary embodiments of the present disclosure, the cut-out wind speed may be reduced by 1 m/s from the currently set cut-out wind speed, and the output power may be set to the rated power after each reduction of the cut-off wind speed. Then, the process continues from step S206.

Returning to FIG. 2, at step S210, if both of the ratios of the fatigue load and the limit load of each component re-predicted for the currently set cut-out wind speed and output power respectively to the corresponding reference load of the component are less than 1, the process proceeds to step S214 where the flag is set to 1 (i.e., indicating that there is potential existence of the final cut-out strategy at the currently set cut-out wind speed). Then the process proceeds to step S215 where it is determined whether the cut-out strategy with the current cut-out wind speed and output power is the final cut-out strategy according to whether the currently set output power meets the convergence condition.

As an example, if the flag is 1, it is indicated that there is the case that both of the ratios of the predicted fatigue load and limit load respectively to the reference load are less than 1 after step S207, that is, there may be a final cut-out strategy at the current cut-out wind speed. Thus it is necessary to determine whether the cut-out strategy with the current cut-out wind speed and output power is the final cut-out strategy according to whether the currently set output power meets the convergence condition, that is, the process proceeds to step S215.

At step S215, when the currently set output power fails to meet the convergence condition, the process proceeds to step S208 to re-adjust the output power, that is, a further iteration is performed. When the currently set output power meets the convergence condition, whether the cut-out strategy with the current cut-out wind speed and output power is the final cut-out strategy may be determined by determining whether a current state reaches a maximum power generation amount or reaches a preset number of iterations. That is, the process proceeds to step S216, which will be described below with reference to FIG. 4.

Figure 4:
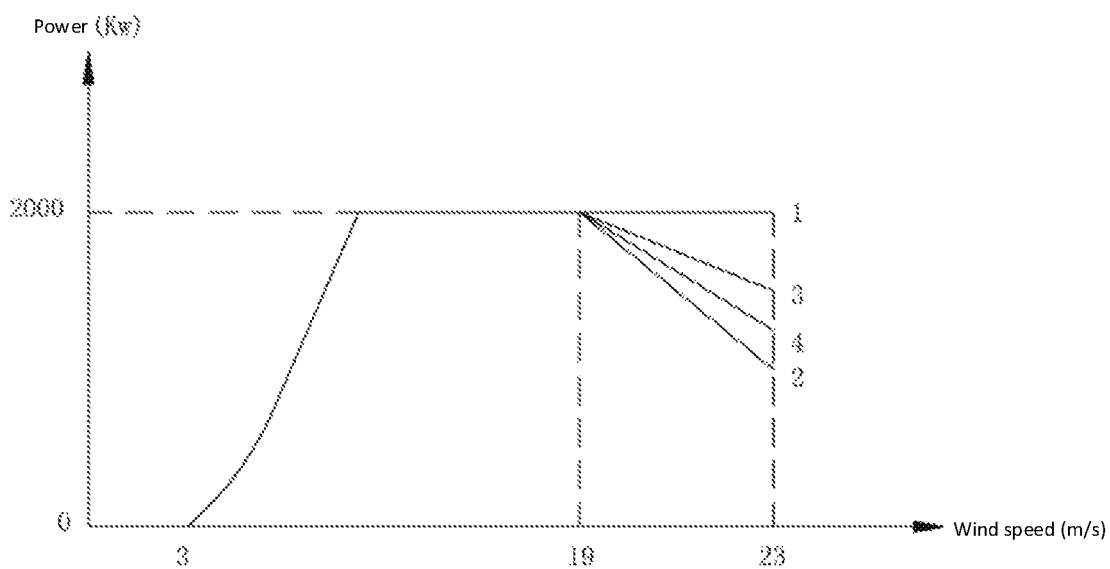
FIG. 4 is another diagram of adjusting a cut-out strategy based on a dichotomy method according to an exemplary embodiment of the present disclosure.

FIG. 4 is another diagram of adjusting a cut-out strategy based on a dichotomy method according to an exemplary embodiment of the present disclosure. As shown in FIG. 4, the second comparison is performed at step S207. If any of the ratios of the fatigue load and the limit load of each component predicted for the currently set cut-out wind speed and output power respectively to the reference load of the corresponding component is greater than or equal to 1, at step S208, the output power may be set to a half of the rated power based on the dichotomy method, that is, 1000 Kw (mode 2 in FIG. 4) in the case where the cut-out wind speed is set to 23 m/s according to the probability density distribution of wind speed and the output power is set to the rated power (i.e., 2000 Kw).

Then, at step S209, the fatigue load and the limit load of each component of the wind turbine are re-predicted based on the currently set initial wind speed (23 m/s) and output power (1000 Kw). At step S210, the re-predicted fatigue load and limit load of each component are respectively compared with the reference load of the component. At step S210, if both of the ratios of the fatigue load and the limit load of each component re-predicted for the currently set cut-out wind speed and output power respectively to the corresponding reference load of the component are less than 1, the process proceeds to S214 where the flag is set to 1 which means that there may be the final cut-out strategy in the case of the currently set cut-out wind speed (23 m/s). Thereafter, at step S215, it is determined whether the currently set output power meets a preset convergence condition to determine whether the cut-out strategy with the current cut-out wind speed and output power is the final cut-out strategy. In some exemplary embodiments of the present disclosure, the preset convergence condition refers to a certain convergence precision, that is, an absolute value of a difference between a currently set output power and a previously set output power. For example, the convergence precision may be set to 50 Kw. However, the preset convergence condition in the present disclosure is not limited to the embodiments.

At step S215, if the currently set output power (1000 Kw) fails to meet the preset convergence condition, for example, the difference between the two end values 1000 Kw and 2000 Kw of an interval [1000 Kw, 2000 Kw] is greater than a predetermined threshold, it is necessary to find out the final output power within the interval [1000 Kw, 2000 Kw]. Then the process returns to step S208 where the dichotomy method is used to set the output power. As an example, in FIG. 4, forward-search of the dichotomy method is used to reset the output power to, for example, the intermediate value between the currently set output power 1000 Kw and the previously set output power 2000 Kw, that is, the output power is set to 1500 Kw (mode 3 in FIG. 4). Then, step S209 is performed to re-predict the fatigue load and the limit load of each component, and at step S210, the re-predicted fatigue load and limit load of each component are respectively compared with the reference load of the corresponding component. At step S210, if both of the ratios are less than 1, the process proceeds to step S214 where the flag is set to 1, and then proceeds to step S215 where it is determined whether the output power meets the convergence condition (i.e., it is determined whether the difference between the end values 1000 Kw and 1500 Kw of an interval [1000 Kw, 1500 Kw] is less than or equal to a predetermined threshold). If the difference is greater than the predetermined threshold, it means that the final output power should be continuously searched within the interval [1000 Kw, 1500 Kw]. For example, backward-search of the dichotomy method may be used to reset the output power (to set the output power to an intermediate value between the currently set output power 1500 Kw and the previously set output power 1000 Kw), i.e., the output power is set to 1250 Kw (mode 4 in FIG. 4). Conversely, at step S210, if any of the ratios is greater than or equal to 1, it is determined at step S211 whether the flag is 0. As the flag has been set to 1 in the case where the output power is set to 1000 Kw, the process may still proceed to step S215. This process is iterative until the preset convergence conditions is met. If it is determined at step S215 that the currently set output power meets the convergence condition, the process may proceed to step S216. The convergence condition may include the difference between two end values an and bn of an interval [an, bn] which is used when the output power is required to be further determined being less than or equal to a predetermined threshold (for example, 35 Kw). However, the present disclosure is not limited in this respect.

At step S216, if the current state meets at least one of the maximum power generation amount and the preset number of iterations, then at step S217, the cut-out strategy with the current cut-out wind speed and output power is determined as the final cut-out strategy, and the shutdown processing of the wind turbine will be performed based on the final cut-out strategy. If the current state fails to meet the maximum power generation amount and the preset number of iterations, the process may proceed to step S208 to re-adjust the output power, that is, to perform further iterative operations.

In determining whether the current state meets the maximum power generation amount, a linear method and a nonlinear method in operations research may be used to set a function of power generation amount as a constraint condition. Also, an intelligent algorithm such as a particle swarm algorithm, a genetic algorithm, or the like may also be used. However, the present disclosure is not limited in this respect.

Figure 5:
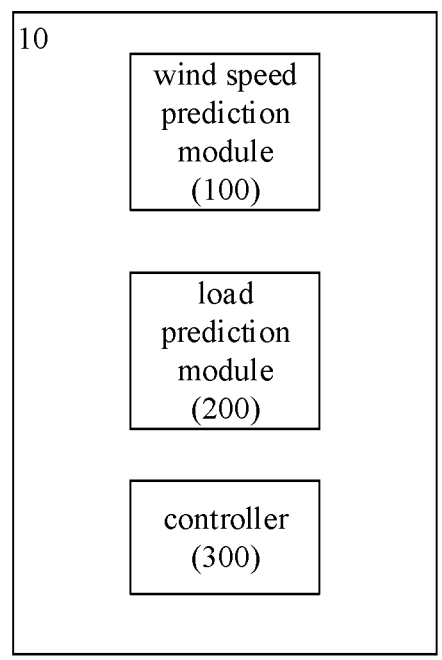
FIG. 5 is a block diagram of an apparatus for self-adaption of a cut-out strategy according to an exemplary embodiment of the present disclosure.

FIG. 5 is a block diagram of an apparatus for self-adaption of a cut-out strategy 10 according to an exemplary embodiment of the present disclosure. As shown in FIG. 1, the apparatus for self-adaption of a cut-out strategy 10 includes a wind speed prediction module 100, a load prediction module 200, and a controller 300. The controller 300 may be configured to control the wind speed prediction module 100 and the load prediction module 200. The wind speed prediction module 100 may be configured to predict, using a wind speed prediction model, a wind resource parameter of a wind turbine at each machine location. The load prediction module 200 may configured to predict, using a load prediction model, a fatigue load and a limit load of the wind turbine based on the predicted wind resource parameter and an air density. The controller 300 may be configured to compare the predicted fatigue load and limit load with a reference load and determine the cut-out strategy based on a result of the comparison.

In the present disclosure, the wind speed prediction model may be established by using historical wind resource parameters that are collected in the site to predict the wind resource parameter in a future period of time, and the load prediction model may be established to predict the current fatigue load and limit load of the wind turbine, so that the cut-out strategy can be optimized based on the predicted wind resource conditions.

The wind speed prediction module 100 may be configured to train the wind speed prediction model by applying a neural network algorithm based on historical wind resource parameters measured by a wind tower, and correct the trained wind speed prediction model in real time with a real-time wind speed measured by a wind measuring device. The training of the wind speed prediction model is the same as the process in step S101, and will not be repeated here.

The load prediction module 200 may be configured to: sample historical wind resource parameters measured by a wind tower; perform, by a wind turbine simulation system, a simulation with the sampled wind resource parameters as inputs of load calculation; and build the load prediction model using a result of the simulation based on a nonlinear regression method. For example, the load prediction module 200 may be configured to use a Monte-Carlo sampling method to sample the historical wind resource parameters measured by the wind tower. The load prediction module 200 may be configured to perform, using a simulation system such as bladed or HACW2, a simulation with the sampled wind resource parameters as inputs of the load calculation by. The load prediction module 200 may be configured to build a Wind2load model using the simulation results based on the nonlinear regression method. The load prediction module 200 may then be configured to predict the fatigue load and the limit load of the wind turbine using the built Wind2load model.

The controller 300 may be configured to, after prediction of the fatigue load and the limit load of the wind turbine, compare the predicted fatigue load and limit load with the corresponding reference load respectively. The controller 300 may be configured to determine a cut-out strategy with an original cut-out wind speed and a rated power as a final cut-out strategy when any of ratios of the predicted fatigue load and limit load respectively to the reference load is greater than or equal to 1, and thus the controller 300 may be configured to perform the shutdown processing of the wind turbine according to the final cut-out strategy. The controller 300 may be configured to adjust the cut-out wind speed and the output power when both of the ratios of the predicted fatigue load and limit load respectively to the reference load are less than 1.

As an example, the controller 300 may be configured to re-determine the cut-out wind speed based on the probability density distribution of the wind speed.

The controller 300 may be configured to, after adjusting of the cut-out wind speed, set the output power to the rated power and set a flag indicating potential existence of a final cut-out strategy at the current cut-out wind speed to 0. When the flag is 0, there may not be the final cut-out strategy at the currently set cut-out wind speed. The controller 300 may be configured to change the output power by changing the rotational speed of a impeller(s) of the wind turbine and the torque of the wind turbine.

After the cut-out wind speed is re-determined based on the probability density distribution of the wind speed and the output power is set to the rated power, the load prediction module 200 may be configured to predict the fatigue load and the limit load of the wind turbine using the load prediction model for the currently set cut-out wind speed and output power.

After prediction of the fatigue load and the limit load of the wind turbine, the controller 300 may be configured to compare the predicted fatigue load and limit load with the corresponding reference load. The controller 300 may be configured to determine the cut-out strategy with the currently set cut-out wind speed and output power as the final cut-out strategy when both of the ratios of the predicted fatigue load and limit load for the currently set cut-out wind speed and output power respectively to the reference load are less than 1, and perform the shutdown processing of the wind turbine based on the final cutting strategy.

The controller 300 may be configured to re-adjust the cut-out strategy when any of the ratios of the predicted fatigue load and limit load for the currently set cut-out wind speed and output power respectively to the reference load is greater than or equal to 1. For example, the output power may be changed by changing the rotational speed of the impeller of the wind turbine and the torque of the wind turbine. As an example, the controller 300 may be configured to adjust the output power by using a dichotomy method.

The controller 300 may be configured to re-predict the fatigue load and the limit load of the wind turbine using the load prediction model for the currently set cut-out wind speed and output power. The controller 300 may be configured to, thereafter, compare the predicted fatigue load and limit load with the corresponding reference load respectively (hereinafter, this comparison is referred to as "a third comparison"). The controller 300 may be configured, when any of the ratios of the fatigue load and the limit load re-predicted for the currently set cut-out wind speed and output power respectively to the reference load is greater than or equal to 1, to determine whether to reduce the cut-out wind speed, that is, to determine whether the flag is 0. The controller 300 may be configured, when the flag is 0, to determine whether the currently set output power is less than or equal to a predetermined lower limit.

When the currently set output power is greater than the predetermined lower limit, the output power can be further reduced to determine the optimal cut-out strategy at the current cut-out wind speed. Then the controller 300 may be configured to re-adjust the output power and perform re-prediction. When the currently set output power is less than or equal to the predetermined lower limit, there is no need to further reduce the output power for the currently set cut-out wind speed, but it is necessary to reduce the cut-out wind speed to determine the cut-out strategy. Then the controller 300 may be configured to reduce the cut-out wind speed. For example, the cut-out wind speed may be set to the currently set cut-out wind speed minus 1 m/s. However, the present disclosure is not limited in this respect, and the cut-out wind speed can be reduced by any suitable value.

In determining whether to reduce the cut-out wind speed, if the flag is 1, it is indicated that there may be a final cut-out strategy at the current cut-out wind speed. Thus the controller 300 may be configured to determine whether the cut-out strategy with the current cut-out wind speed and output power is the final cut-out strategy according to whether the currently set output power meets the convergence condition.

In the third comparison, the controller 300 may be configured to set the flag to 1 (i.e., indicating that there may be a final cut-out strategy at the currently set cut-out wind speed), if both of the ratios of the fatigue load and the limit load of each component re-predicted for the currently set cut-out wind speed and output power respectively to the corresponding reference load of the component are less than 1. The controller 300 may be configured to determine whether the cut-out strategy with the currently set cut-out wind speed and output power is the final cut-out strategy according to whether the currently set output power meets the convergence condition.

The controller 300 may be configured to, when the currently set output power fails to meet the convergence condition, re-adjust the output power, that is, perform further iterative operations. The controller 300 may be configured to, when the currently set output power meets the convergence condition, determine whether the cut-out strategy with the current cut-out wind speed and output power is the final cut-out strategy by determining whether the current state reaches the maximum power generation amount or reaches the preset number of iterations.

The controller 300 may be configured to, if the current state meets at least one of the maximum power generation amount and the preset number of iterations, determine the cut-out strategy with the current cut-out wind speed and output power as the final cut-out strategy and perform the shutdown processing of the wind turbine according to the final cut-out strategy. The controller 300 may be configured to, if the current state fails to meet the maximum power generation amount and the preset number of iterations, re-adjust the output power, that is, perform further iterative operations. A method of dynamically adjusting the cut-out strategy can be realized based on the above procedure.

The method(s) for self-adaption of a cut-out strategy according to the embodiment of the present disclosure may be implemented as computer readable instructions on a computer readable recording medium or may be transmitted through a transmission medium. The computer readable recording medium may be any data storage device that may store data that can be read by a computer system thereafter. Examples of the computer readable recording medium may include, but are not limited to, a read only memory (ROM), a random access memory (RAM), a compact disk (CD)-ROM, a digital versatile disk (DVD), a magnetic tape, a floppy disk, an optical data storage device. The embodiments are not limited in this respect. The transmission medium may include carriers that are transmitted over a network or various types of communication channels. The computer readable recording medium may also be distributed over computer systems connected to the network such that the computer readable instructions may be stored and executed in a distributed fashion.

Based on the above described method and apparatus for dynamically adjusting the cut-out wind speed and the cut-out strategy, the wind resource prediction model may be used to predict the wind resource level of wind turbine(s) at each machine location, and the cut-out wind speed and the cut-out strategy of the wind turbine(s) can be dynamically optimized in combination with a load constraint. As a result, a certain loss in the generated energy by shutdown of the wind turbine is avoided when the wind speed exceeds the original cut-out wind speed, but the limit load that the wind turbine can withstand does not necessarily exceed the design threshold.

While the present invention has been particularly shown and described with reference to exemplary embodiments, it will be understood by those skilled in the art that various changes in form and detail may be made without departing from the spirit and scope of the disclosure as limited by the appended claims.

What is claimed is:

1. A method for self-adaption of a cut-out strategy, comprising:
    predicting, using a wind speed prediction model, a wind resource parameter of a wind turbine at each machine location;
    predicting, using a load prediction model, a fatigue load and a limit load of the wind turbine based on the predicted wind resource parameter and an air density;
    comparing the predicted fatigue load and limit load with a reference load; and
    determining the cut-out strategy based on a result of the comparison,
    wherein determining the cut-out strategy comprises dynamically adjusting a cut-out wind speed and an output power.

2. The method of claim 1, wherein predicting, using a wind speed prediction model, a wind resource parameter of a wind turbine at each machine location comprises:
    training the wind speed prediction model by applying a neural network algorithm based on historical wind resource parameters measured by a wind tower; and
    correcting the trained wind speed prediction model in real time with a real-time wind speed measured by a wind measuring device.

3. The method of claim 1, wherein predicting, using a load prediction model, a fatigue load and a limit load of the wind turbine comprises:
    sampling historical wind resource parameters measured by a wind tower;
    performing, by a wind turbine simulation system, a simulation with the sampled wind resource parameters as inputs of load calculation; and
    building the load prediction model using a result of the simulation based on a nonlinear regression method.

4. The method of claim 1, wherein determining the cut-out strategy based on a result of the comparison comprises:
    determining a cut-out strategy with an original cut-out wind speed and a rated power as a final cut-out strategy, when any of ratios of the predicted fatigue load and limit load respectively to the reference load is greater than or equal to 1; and
    adjusting the cut-out wind speed and the output power when both of the ratios of the predicted fatigue load and limit load respectively to the reference load are less than 1.

5. The method of claim 4, wherein adjusting the cut-out wind speed and the output power comprises:
determining the cut-out wind speed based on a probability density distribution of the wind speed;
performing a first setting operation of setting the output power to the rated power;
setting a flag indicating potential existence of a final cut-out strategy at a current cut-out wind speed to 0;
predicting, using the load prediction model, the fatigue load and the limit load of the wind turbine for the currently set cut-out wind speed and output power;
determining a cut-out strategy with the currently set cut-out wind speed and output power as the final cut-out strategy, when both of the ratios of the predicted fatigue load and limit load for the currently set cut-out wind speed and output power respectively to the reference load are less than 1; and
re-adjusting the cut-out strategy when any of the ratios of the predicted fatigue load and limit load for the currently set cut-out wind speed and output power respectively to the reference load is greater than or equal to 1.

6. The method of claim 5, wherein re-adjusting the cut-out strategy comprises:
adjusting the output power;
re-predicting, using the load prediction model, the fatigue load and the limit load of the wind turbine for the currently set cut-out wind speed and output power;
determining whether to reduce the cut-out wind speed and perform the first setting operation, when any of the ratios of the fatigue load and the limit load re-predicted for the currently set cut-out wind speed and output power respectively to the reference load is greater than or equal to 1; and
setting the flag to 1 and determining whether the cut-out strategy with the currently set cut-out wind speed and output power is the final cut-out strategy according to whether the currently set output power meets a convergence condition, when both of the ratios of the fatigue load and the limit load re-predicted for the currently set cut-out wind speed and output power respectively to the reference load are less than 1.

7. The method of claim 6, wherein determining whether to reduce the cut-out wind speed and perform the first setting operation comprises:
in case that the flag is 0, adjusting the output power and performing the re-prediction when the currently set output power is greater than a predetermined lower limit, and reducing the cut-put wind speed and performing the first setting operation when the currently set output power is less than or equal to the predetermined lower limit; and
in case that the flag is 1, determining whether the cut-out strategy with the current cut-out wind speed and output power is the final cut-out strategy by determining whether a current state reaches a maximum power generation amount or reaches a preset number of iterations when the currently set output power meets the convergence condition; and adjusting the output power and performing the re-prediction when the currently set output power fails to meet the convergence condition.

8. The method of claim 6, wherein determining whether the cut-out strategy with the current cut-out wind speed and output power is the final cut-out strategy comprises:
determining whether the cut-out strategy with the current cut-out wind speed and output power is the final cut-out strategy by determining whether a current state reaches a maximum power generation amount or reaches a preset number of iterations, when the currently set output power meets the convergence condition; and
adjusting the output power and performing the re-prediction when the currently set output power fails to meet the convergence condition.

9. The method of claim 8, wherein determining whether the cut-out strategy with the current cut-out wind speed and output power is the final cut-out strategy by determining whether a current state reaches a maximum power generation amount or reaches a preset number of iterations comprises:
determining the cut-out strategy with the current cut-out wind speed and output power as the final cut-out strategy when the current state reaches any of the maximum power generation amount and the preset number of iterations; and
adjusting the output power and performing the re-prediction when the current state fails to reach any of the maximum power generation amount and the preset number of iterations.

10. The method of claim 7, wherein determining whether the cut-out strategy with the current cut-out wind speed and output power is the final cut-out strategy by determining whether a current state reaches a maximum power generation amount or reaches a preset number of iterations comprises:
determining the cut-out strategy with the current cut-out wind speed and output power as the final cut-out strategy when the current state reaches any of the maximum power generation amount and the preset number of iterations; and
adjusting the output power and performing the re-prediction when the current state fails to reach any of the maximum power generation amount and the preset number of iterations.

11. The method of claim 1, wherein adjusting the output power comprises adjusting the output power using a dichotomy method or a golden section method.

12. A non-transitory computer readable storage medium storing a program, wherein the program comprises instructions for performing the method of claim 1.

13. An apparatus for self-adaption of a cut-out strategy, comprising:
a processor;
a memory for storing processor-executable instructions;
wherein the processor is configured to:
predict, using a wind speed prediction model, a wind resource parameter of a wind turbine at each machine location;
predict, using a load prediction model, a fatigue load and a limit load of the wind turbine based on the predicted wind resource parameter and an air density; and
compare the predicted fatigue load and limit load with a reference load and determine the cut-out strategy based on a result of the comparison,
wherein the determination of the cut-out strategy comprises dynamically adjusting a cut-out wind speed and an output power.

14. The apparatus of claim 13, wherein the processor is further configured to: train the wind speed prediction model by applying a neural network algorithm based on historical wind resource parameters measured by a wind tower; and correct the trained wind speed prediction model in real time with a real-time wind speed measured by a wind measuring device.

15. The apparatus of claim 13, wherein the processor is further configured to: sample historical wind resource parameters measured by a wind tower; perform, by a wind turbine simulation system, a simulation with the sampled wind resource parameters as inputs of load calculation; and build the load prediction model using a result of the simulation based on a nonlinear regression method.

16. The apparatus of claim 13, wherein the processor is further configured to:
   determine a cut-out strategy with an original cut-out wind speed and a rated power as a final cut-out strategy, when any of ratios of the predicted fatigue load and limit load respectively to the reference load is greater than or equal to 1; and
   adjust the cut-out wind speed and the output power when both of the ratios of the predicted fatigue load and limit load respectively to the reference load are less than 1.

17. The apparatus of claim 16, wherein the processor is further configured to:
   determine the cut-out wind speed based on a probability density distribution of the wind speed;
   perform a first setting operation of setting the output power to the rated power;
   set a flag indicating potential existence of a final cut-out strategy at a current cut-out wind speed to 0;
   predict, using the load prediction model, the fatigue load and the limit load of the wind turbine for the currently set cut-out wind speed and output power;
   determine a cut-out strategy with the currently set cut-out wind speed and output power as the final cut-out strategy, when both of the ratios of the predicted fatigue load and limit load for the currently set cut-out wind speed and output power respectively to the reference load are less than 1; and
   re-adjust the cut-out strategy when any of the ratios of the predicted fatigue load and limit load for the currently set cut-out wind speed and output power respectively to the reference load is greater than or equal to 1.

18. The apparatus of claim 17, wherein the processor is further configured to:
   adjust the output power;
   re-predict, using the load prediction model, the fatigue load and the limit load of the wind turbine for the currently set cut-out wind speed and output power;
   determine whether to reduce the cut-out wind speed and perform the first setting operation, when any of the ratios of the fatigue load and the limit load re-predicted for the currently set cut-out wind speed and output power respectively to the reference load is greater than or equal to 1; and
   set the flag to 1 and determine whether the cut-out strategy with the currently set cut-out wind speed and output power is the final cut-out strategy according to whether the currently set output power meets a convergence condition, when both of the ratios of the fatigue load and the limit load re-predicted for the currently set cut-out wind speed and output power respectively to the reference load are less than 1.

19. The apparatus of claim 18, wherein the processor is further configured to:
   in case that the flag is 0, adjust the output power and perform the re-prediction when the currently set output power is greater than a predetermined lower limit; and reduce the cut-put wind speed and perform the first setting operation when the currently set output power is less than or equal to the predetermined lower limit; and
   in case that the flag is 1, determine whether the cut-out strategy with the current cut-out wind speed and output power is the final cut-out strategy by determining whether a current state reaches a maximum power generation amount or reaches a preset number of iterations when the currently set output power meets the convergence condition; and adjust the output power and perform the re-prediction when the currently set output power fails to meet the convergence condition.

20. The apparatus of claim 18, wherein the processor is further configured to:
   determine whether the cut-out strategy with the current cut-out wind speed and output power is the final cut-out strategy by determining whether a current state reaches a maximum power generation amount or reaches a preset number of iterations, when the currently set output power meets the convergence condition; and
   adjust the output power and perform the re-prediction when the currently set output power fails to meet the convergence condition.

\* \* \* \* \*